Patented Aug. 7, 1934

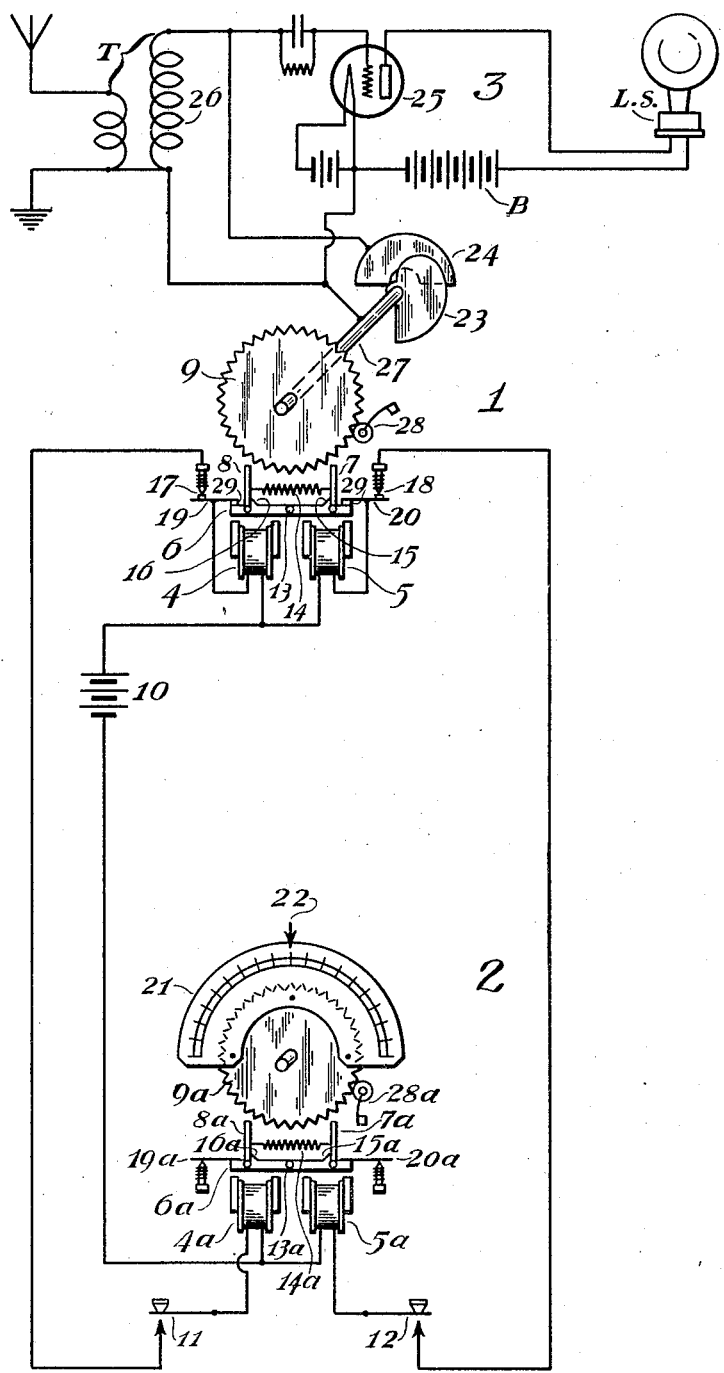

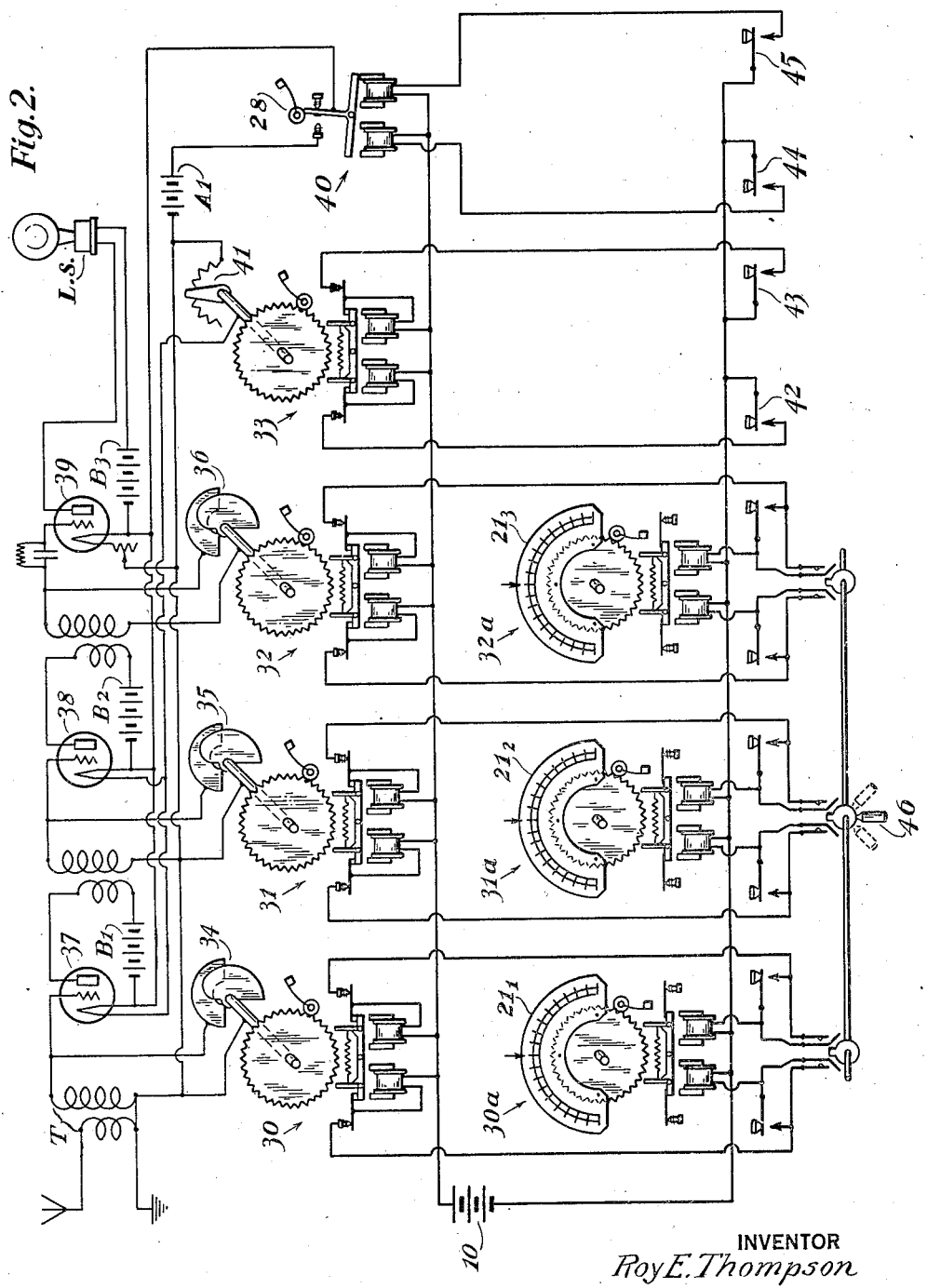

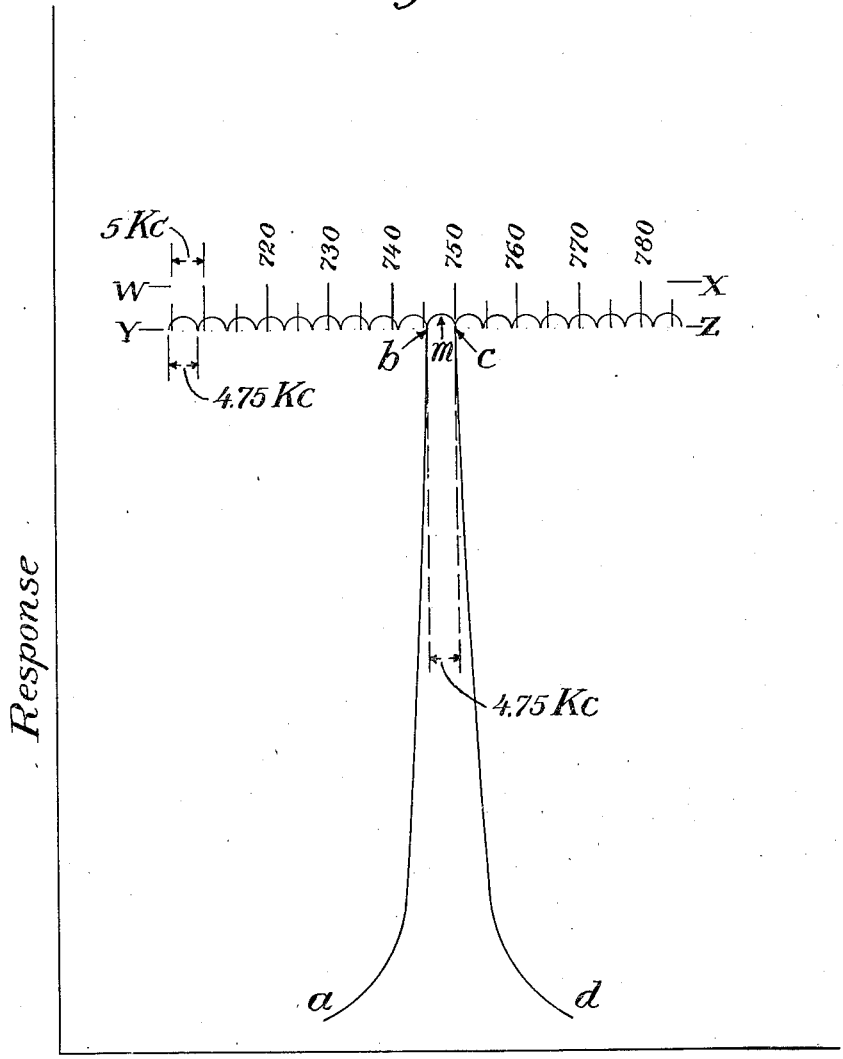

1,968,973

UNITED STATES PATENT OFFICE 1,968,973

REMOTE CONTROL SYSTEM

Roy E. Thompson, Nyack, N. Y., assignor to Thompson Patents Corporation, New York, N. Y., a corporation of New York Application August 5, 1927, Serial No. 210,780

2 Claims. (Cl. 250—40)

This invention relates to the remote control of electrical apparatus, more especially the control of radio apparatus including a plurality of circuits, as for example a radio receiver.

The invention has for one object the provision of methods and means whereby adjustable apparatus may be completely controlled from a remote point, with a resultant increase in the efficiency and convenience of the entire installation; other objects being the provision of a step-by-step tuning control which will always tune a given circuit to a value within any desired predetermined resonance tolerance, and the further provision of remote-control means whereby a plurality of circuits may be either collectively or individually controlled at the will of the operator.

It is generally recognized that the reason for the high cost of the modern type of radio receiver is that it is extremely difficult, and correspondingly expensive, to design an electrically efficient radio receiver which at once possesses, in high degree, good selectivity, sensitivity, fidelity of signal reproduction, simplicity of control, conveniently small proportions, and beauty of design. As is well known, the first three of the advantageous features just mentioned are mutually compatible, and correspondingly, the last three are mutually compatible; those of the first group bearing no functional relation to those of the second group. The present invention proposes to separate the entire system into two groups, such that the features of the first group may be embodied in a radio receiving apparatus designed solely with a view to stressing those features, and secondly a remote-control device embodying the features of the second group.

A simple and practicable means whereby these and other objects can be achieved may comprise an impulse control device electrically connected to one or more primary motors, these motors being mechanically coupled to the particular apparatus which it is desired to control. The system should be so arranged that the motors may operate synchronously, or individually, at the will of the operator. Suitable indicating devices may be associated with a secondary motor, or repeater, electrically connected to the corresponding primary motor, in order to afford the operator a visual indication of the adjusted positions of the apparatus controlled by the primary motor.

A better understanding of the present invention may be had by reference to the accompanying drawings, in which—

Fig. 1 illustrates a primary motor, a secondary motor, or repeater, and indicator, arranged to remotely control the tuning of a simple radio receiver;

Fig. 2 illustrates the combination of a plurality of systems, after the manner of that shown in Fig. 1, cooperating to control the several tuned circuits and the filament current of a more elaborate vacuum tube radio receiver;

Fig. 3 is a typical resonance curve of one of the tuned radio-frequency circuits of the receivers of Figs. 1 and 2, and shows the manner in which the control system of this invention may be adjusted to respond to any desired frequency.

Referring now to Fig. 1, there is illustrated a primary motor 1, a secondary motor, or repeater 2, and a simple radio receiver 3, the tuning of which is controlled by primary motor 1. Primary motor 1, as illustrated, comprises essentially two electromagnets 4 and 5, a balanced armature 6, pawls 7 and 8, circuit breaker 17 and ratchet wheel 9. Spring 19 of circuit breaker 17 is insulated at 29 from armature 6. Upon closure of either of the keys 11 and 12, the battery 10 energizes either magnet 4 or 5 depending upon which key is closed. The secondary motor 2 includes component parts which are similar to the corresponding parts of the primary motor just mentioned, except that the circuit breaker is omitted. It will thus be observed that when, for instance, key 11 is closed, current flowing from the battery 10 energizes a series circuit including the primary motor magnet 4 and the repeater magnet 4a. No current will flow, however, thru the complementary circuit including primary motor magnet 5 and repeater magnet 5a because key 12 in that circuit is open. Thus, when magnet 4 is energized, the end of the balanced armature 6, positioned in appropriate relation to magnet 4, is attracted by the magnet, and therefore rotates about its axis 13. At the same time pawl 7 presses against an adjacent ratchet tooth on the periphery of wheel 9, rotating that wheel counter-clockwise a distance corresponding to the pitch of one tooth. This motion will also require a movement of pawl 7 so as to follow the periphery of the wheel. Pawl 7, as well as pawl 8, is, therefore, pivoted at the point where it is secured to the armature 6. The two pawls, 7 and 8, are held in their normal positions by means of a spring 14 which tends to draw those two members together against stops 15 and 16 which, preferably, are an integral part of the armature. Simultaneously with the action described, the repeater, or secondary motor 2, will operate in the same manner, the magnet 4a attracting armature 6a which rotates about its axis 13a, and in turn rotates the repeater ratchet wheel 9a counter-clockwise a distance equivalent to the pitch of one tooth. When the operations above recited have taken place the energizing circuit, including magnets 4 and 4a, will be broken by reason of the fact that the rotation of the armature 6 breaks the contact at 17. Both magnets are then de-energized and the springs 19 and 20a, respectively, return the two armatures 6 and 6a, respectively, to their normal positions. When the armature 6 returns to its normal position the adjustable contact at 17 is closed again, and the cycle is repeated, whereby both ratchet wheels are advanced in a counter-clockwise direction a distance equivalent to the pitch of another tooth. Accordingly, it will be seen that as long as key 11 remains closed the two ratchet wheels will rotate synchronously in a step-by-step motion. The rate of motion is determined and controlled largely by the mass of the moving parts and the adjusted tension of the springs. For example, in a certain operative model, the armature vibrates at a period of 5 per second, the wheel rotating once in 40 seconds. This rate is slow enough to allow the operator to count the impulses so that an adjustment of one or two divisions of the indicating dial, for close tuning, is entirely practicable. If it is desired that the wheels be rotated in a clockwise direction, it is necessary merely to close the key 12, when the system will operate in a manner exactly similar to that just described, except of course, that in the present instance the electromagnets 5 and 5a and the adjustable contact 18 are then in the electric circuit.

As will be observed from Fig. 1, the toothed wheel 9a functions as an indicating device by reason of the fact that it carries an attached indicator dial or scale 21. This dial, together with index 22, gives to the operator a visual indication of the position of the wheel 9a, and consequently of the position of wheel 9. The latter wheel may be mechanically connected with a tuning condenser, represented by the two plates 23 and 24. While only two condenser plates are illustrated, it is to be understood that any desired number of plates may be employed, and in fact that any desired mechanically controlled operation may be performed by the rotation of wheel 9, the control of a tuning condenser being shown by way of example.

The radio receiving apparatus represented by reference character 3 is likewise indicated by way of example, the particular arrangement shown being a radio receiver comprising a vacuum tube detector 25 whose input circuit includes the condenser-tuned secondary winding 26 of coupling transformer T, and whose output circuit includes loud speaker LS and plate battery B.

In the system just described, upon closure of key 11, wheel 9 rotates in a counter-clockwise direction and the movable condenser plate 23 will therefore be rotated in a counter-clockwise direction by shaft 27. It is not usually necessary that shaft 27 be electrically insulated from rotating plates 23 because the latter are customarily grounded. However, it sometimes is desirable to insulate the shaft from the device which it controls. The frequency of the tuned input circuit of tube 25 will be decreased as the result of this counter-clockwise rotation of the movable condenser plates 23 because of the increase of capacity effected thereby. Similarly, closure of key 12 will effect an increase in frequency, the amount of decrease or increase of frequency of the circuit depending upon the length of time either key is held closed. In order to assure that the motion of the primary motor, and in this instance the motion of the tuning condenser 23—24, is exactly the same as the indicated motion and position at rest of the secondary motor indicator 21—22, spring-pressed rollers 28 and 28a, respectively, are arranged to bear upon the teeth of the two ratchet wheels, respectively, so that the two wheels will always come to rest in the same corresponding positions. It should be understood that altho the tuning condenser 23—24 is shown directly connected by shaft 27 to the primary motor ratchet wheel 9, either a reduced motion or a multiplied motion of the condenser may readily be had by interposing in the shaft 27 either a reducing or a multiplying gear; and that furthermore such gear may be of the eccentric type if a constant-rate rotary motion of the condenser plates is not desired. Because of the fact that the secondary motor, or repeater, does very little mechanical work, the construction, especially of its magnets, may be much smaller and lighter than that of the driving or primary motor.

In Fig. 2 is shown a cooperative combination of several remote control systems which fundamentally may be similar to the system previously described in connection with Fig. 1. In this embodiment the primary motors 30, 31 and 32 and the remotely controlled, or secondary, motors 30a, 31a and 32a, respectively, may be substantially identical with the corresponding primary motor 1 and secondary motor 2 of the former figure. Each of the primary motors 30, 31 and 32 is mechanically coupled to a variable tuning condenser 34, 35 and 36, respectively, each tuning condenser in turn being electrically connected in the tuned input circuit of a vacuum tube, 37, 38 and 39 respectively, of a radio receiver.

The radio receiver, diagrammatically represented, is shown as being of a conventional type comprising two transformer-coupled radio-frequency amplifying stages, and a vacuum tube detector, transformer-coupled, to the output circuit of the last radio-frequency amplifying stage. The output circuit of the detector tube 39 is shown as including a plate battery B3 and a loud speaker LS. In order to simplify the drawings the usual audio-frequency amplifier has been omitted, it being understood that a suitable audio-frequency amplifier may be connected in circuit between the detector tube and loud speaker, or other indicating device.

Besides the three remotely controlled tuned circuits in the embodiment of Figure 2, there are shown two additional remotely controlled mechanisms 33 and 40. The primary motor at 33 is substantially similar in all respects to the primary motors previously described, but in this instance motor 33 controls the adjustment of the filament rheostat 41 which is connected in series with the filaments of the two radio-frequency amplifying tubes 37 and 38 to determine the degree of radio-frequency amplification and thus the volume of the output signals.

Keys 42 and 43 are here employed to control the adjustment of the rheostat, closure of key 42 operating to effect an increase in resistance in the filament circuit, and the closure of key 43 operating to effect a decrease in resistance, the degree of change in resistance being determined by the length of time for which the respective keys are closed.

A relay 40 is shown connected in series with the filament-battery A1, whereby the heating current supplied to the filaments of all of the vacuum tubes may be remotely controlled by the operator. This relay, as will be observed from the figure, may be designed in a manner similar to that employed for the secondary motors. The electromagnets may be identical with those of the secondary motors, previously described, the armature being pivoted in the center, and of T shape. An adjustable contact is mounted adjacent one side of the stem of the T, and an adjustable stop on the other side, so that a swing of the armature under the control of the keys 44 and 45 will make or break the filament circuit. In order that the armature may be held either in the " make " position or in the " break " position, a spring-pressed roller 28 is provided. This roller will retain the contact-making member on whichever side of the center line the armature has moved it, under the influence of the appropriate magnet. Obviously any other convenient type of electric relay capable of the same functions can alternately be employed.

The remote controlled radio receiver of Fig. 2 includes a number of features which are not apparent from a consideration of the fundamental system illustrated in Fig. 1. It will be seen, for example, that by means of a gang switch, or multiple contact key 46, preferably of the telephone type, the three tuned stages may be controlled simultaneously, i.e., by throwing to the left the key handle shown in the drawings, the frequency of the three tuned circuits will be simultaneously increased, and by throwing the same key handle to the right, the frequency of the three tuned circuits will be decreased, all to the same degree. When it is desired that any one of the three tuned circuits be individually controlled, one of the control keys $11_1$, $11_2$ or $11_3$ may be closed. At all times the actual setting of the three tuning condensers 34, 35 and 36 will be shown by the positions of the three indicator dials $21_1$, $21_2$ and $21_3$. Since the secondary motors function mechanically merely to move a light wheel carrying an indicating scale, they may readily be constructed according to a compact design. Thus, the control apparatus which normally would include the master key 46, together with the ten (more or less) individual control keys, and as many indicating control dials as required, may all be included in a small and inconspicuous case or cabinet which usually would be placed on a convenient table or desk. The dials, represented by reference characters, 21, $21_1$, etc., are shown in the drawings as covering a semicircle. It is desirable, however, that these dials be of the 360° type, whereby the scale divisions may be more widely separated. In a system such as shown in Fig. 2 where a variable tuning condenser of the 180° type is employed, a 2:1 reduction gear would then be interposed between the ratchet wheels 30-32 inc., and the rotary condenser plates so that a complete revolution of the indicator scale would represent a variation of the condenser capacity from minimum to maximum. Altho no secondary motor and indicating scale are shown in the drawings as being connected to the primary motor 33 controlling the adjustment of the filament rheostat 41, it is obvious that a suitable device similar to any of the other secondary motors illustrated could be used, if desired.

From the foregoing description it will be observed that by means of the present invention an extremely flexible remote control system may be arranged, and that such system will introduce many desirable advantages. In accordance with this invention, it is therefore intended that the radio receiver proper, which would also include the necessary primary motors as a part thereof, may contain the required amount of metal, such as used in shielding and other parts designed to give the best electrical results, and may include adequate spacing between component parts according to the best electrical design regardless of the shape of the housing or container. Such a container may preferably be of metal, and it need not be designed from an aesthetic point of view. This receiver should be located in the most advantageous position based upon radio engineering practice, such as, for instance, close to the point where the antenna enters the building in which the receiver is placed and near an electrically good ground connection. In addition, or alternatively, it may be placed out of the way as, for example, in the attic, the cellar, or in a closet. The control device which may have dimensions of the order of 10" x 4" x 4", connected with the radio receiver by means of a small flexible electric cable, may be placed inconspicuously upon a convenient table or desk and may, within reasonable limits, be moved about at will. A plurality of such control devices may be connected in parallel to a single receiver so that the same may be completely controlled from more than one point.

The present invention introduces a very practicable means for attaining uni-control of a plurality of tuning elements, for the number of primary motors which may be controlled by the control keys is practically unlimited. In addition, individual control of each tuning element may be had by the simple provision of a pair of control keys for each motor.

While it is true that the embodiment of this invention herein illustrated and described includes a step-by-step control, the system is so designed that the tuned radio-frequency circuits may be adjusted to give a maximum response for any desired frequency setting within any given frequency band. This result is achieved in the present embodiment by virtue of the combination of a certain design of tuned radio-frequency circuit and a certain design of control motor; neither one of which may be given, the other being designed accordingly. For example, if the frequency band to be covered is taken as that now existing in the United States for broadcasting purposes, i. e., between 550 and 1500 kilocycles, a range of 950 kilocycles must be covered. The broadcasting stations in the United States are now operating on frequency allocations differing by 10 kilocycles, altho in Fig. 3 separations of 5 kilocycles are illustrated along line W—X. Then, if it is desired to employ a ratchet wheel carrying 200 teeth on the periphery, the rotation of the wheel over a distance corresponding to the pitch of one tooth must effect a frequency change of 4.75 kilocycles. Similarly, if 400 teeth be employed, the pitch of each tooth would represent a frequency change of 2.375 kilocycles. In order that the tuning condensers actuated by the primary motors may always come to rest at a frequency setting substantially resonant to any desired signal frequency, it is proposed, in accordance with this invention, that each tuned circuit be so designed that a typical resonance curve of each such circuit shall have a "flat-top" portion covering a frequency band in kilocycles of not less than the band represented by the pitch of one tooth of the ratchet wheel.

Referring to Fig. 3 of the drawings, there is illustrated a typical resonance, or response, curve $a, b, m, c, d$, plotted from a radio receiver designed in accordance with this invention; this curve having been plotted while varying a tuning element, such as the variable condenser 34 of Fig. 2, and plotting the resonance current response, as ordinates, against the frequency change in kilocycles, as abcissæ. The approximate semi-circles along the line Y—Z represent the "flat-top" portions of a series of such resonance curves taken, for convenience, at the eighteen frequency positions of the control system between 705 and 785 kilocycles. This curve indicates that the tuned circuit (as, for example, the secondary winding of transformer T in shunt with condenser 34, as well as the inherent grid-filament capacity of tube 37, of Fig. 2) has been so designed, by methods known to the art, that the width, $b, c$, of the "flat-top" portion of the response curve is (in this instance) 4.75 kilocycles. It is well understood that the degree of response due to tuning a resonant circuit to a pure, or substantially pure, exciting frequency assumes a form substantially as shown in Fig. 3, whereby a rate of decay from the maximum response to the minimum, or zero point of response as the circuit is detuned either above $(a, b,)$ or below $(c, d,)$ its maximum response frequency $m$, follows a logarithmic law, provided the coupling between the exciting circuit and the receiving circuit is sufficiently loose to avoid substantial reaction between those circuits. Ideally, this condition is fulfilled when the circuits are coupled together by means of a one-way relay, such as the vacuum tube preferably employed after the manner of this invention. It is likewise well known in the art that regardless of the sharpness of tuning of a circuit, and consequently the sharpness of the resulting resonance curve, which may be plotted therefrom, there is always a substantially flat portion $(b, m, c)$ at the top of such curve within which a substantial variation of the tuning element effects but little difference in the response of the signal received.

When, as in the present case, a step-by-step tuning device is used and is so arranged that no one step changes the frequency by an amount greater than that represented by the substantially "flat-top" portion of the curve of the particular circuit of which the tuning device forms a part, it will be impossible for such a step-by-step adjustment to pass thru and not come to rest at a substantially maximum point of response. The curve of Fig. 3 shows, for example, that the lowest possible point of response will lie on the line Y—Z, as shown at $c$, and that this point is so near the maximum point $m$ that no substantial difference in response between the two will be observed. By noting the points where the numbered frequency lines along W—X intersect the different "flat-top" portions it will be seen that each of them falls somewhere on the curve $b, m, c$, and that most of the points represent a greater degree of response than that of the $b$—$c$ level. The practical result of the condition just outlined is that at every frequency setting of the tuned circuits a substantially maximum response will be had; the settings being separated from each other by a frequency of 4.75 kilocycles which is less than the separation between the frequency allocations of the transmitting stations, namely 5 kilocycles, in this instance. It may be noted from the curve that the next successive step either above or below the frequency of the maximum response represented by the "flat-top" portion of the curve will so reduce the signal as to cause it to be incomparable in strength to that represented by a setting falling on one of or between points $b$ and $c$. Since all of the tuned circuits are designed so as to have identical electrical characteristics, the tuned circuits will always be in resonance with each other, and good selectivity will be assured, especially if the circuits are designed for a difference of 5 kilocycles between transmitting station frequencies, as shown on line Y—Z, when in fact the stations are separated by 10 kilocycles as shown on line W—X.

As a practical illustration, we may presume that tuning condenser 34 of Fig. 2 (as well as condensers 35 and 36) is of the so-called logarithmic or "straight-line frequency" type. Such a condenser may have a useful range of electrostatic capacity between 15 micro-microfarads and 260 micro-microfarads, i.e., a variable range of 245 micro-microfarads. An inductance coil of good design, which may be connected in parallel with the tuning condenser, may be of 255 milli-henries inductance. The resistance of this tuned circuit will be determined largely by the electrical characteristics of the particular apparatus employed and, therefore, no universal specifications can be given. It is usually necessary to determine by measurement in a laboratory what changes, if any, need be made in the ordinary radio-frequency transformer and variable condenser in order to obtain a tuned circuit possessing the required characteristics as described in connection with Fig. 3. It is sometimes necessary to introduce resistance into the tuned circuit, as by employing a small gauge wire for the secondary of the transformer, or in some cases by including a resistance winding in the circuit. While it is usually desirable to employ in a radio receiver for broadcast reception a "straight-line frequency" condenser, whereby a given angular rotation of the movable plates of the condenser will effect a frequency change of a uniform amount between any two points intermediate the minimum and maximum settings of the condenser, it is sometimes advantageous to employ a condenser which will give a certain percentage change in the frequency corresponding to any given angular movement of the rotatable condenser plates. The choice of the particular type of condenser employed, whether it be of the straight-line, constant frequency change, constant capacity change, constant percentage of capacity change, or some other form, is ordinarily determined by the particular use to which the radio receiver is to be put, i.e., the scheme employed in the allocation of the frequency assignments of the transmitting stations from which it is desired to receive.

I claim:

1. The combination in a radio receiving system of a plurality of tuning devices, remote control means whereby each of said tuning devices is individually operable from a remote point, and means remotely operable for operating said tuning devices simultaneously.

2. In a remotely-controlled radio receiving system, a plurality of tuned circuits, each including a variable tuning device, a plurality of electromagnetic step-by-step motors, each individually associated with and adapted to operate one of said tuning devices, the circuit connections for said motors extending to a remote point, switching means included in said circuit connections at said remote point for operating said motors individually, and switching means at said remote point for closing the operating circuits of said motors simultaneously.

ROY E. THOMPSON.